United States Patent

Watanabe et al.

[11] Patent Number: 5,772,925
[45] Date of Patent: Jun. 30, 1998

[54] ANTI-REFLECTIVE COATING COMPOSITION

[75] Inventors: Satoshi Watanabe; Toshinobu Ishihara; Ichiro Kaneko; Katsuyuki Oikawa; Yoshihumi Takeda, all of Nakakubiki-gun, Japan

[73] Assignee: Shin-Etsu Chemical Co., Ltd., Tokyo, Japan

[21] Appl. No.: 891,000

[22] Filed: Jul. 10, 1997

Related U.S. Application Data

[63] Continuation of Ser. No. 441,739, May 16, 1995, abandoned.

[30] Foreign Application Priority Data

Jun. 29, 1994 [JP] Japan ................................ 6-169971

[51] Int. Cl.$^6$ ................................ F21V 9/00; B05B 5/00; B05D 5/06
[52] U.S. Cl. ........................ 252/582; 252/587; 252/589; 427/161; 427/162
[58] Field of Search .................................. 252/582, 587, 252/589; 427/161, 162

[56] References Cited

U.S. PATENT DOCUMENTS

| | | |
|---|---|---|
| 3,959,350 | 5/1976 | Rogers .................................... 427/162 |
| 4,595,548 | 6/1986 | St. Clair et al. ........................ 427/162 |
| 4,603,061 | 7/1986 | St. Clair et al. ........................ 427/162 |
| 4,910,122 | 3/1990 | Arnold et al. . | |
| 5,234,990 | 8/1993 | Flaim et al. ............................ 524/609 |
| 5,310,619 | 5/1994 | Crivello et al. . | |
| 5,534,201 | 7/1996 | Summers et al. ....................... 252/582 |

FOREIGN PATENT DOCUMENTS 0 159 428 10/1985 European Pat. Off. .
0 249 139 12/1987 European Pat. Off. .

OTHER PUBLICATIONS

Valley et al., Appl. Phys. Lett., vol. 60, No. 2, pp. 160–162, (1992).

Wu et al., J. Appl., Phys., vol. 69, No. 10, pp. 7366–7368, (1991).

Chemical Patents Index, Documentation Abstract Journal, week 9233, Derwent Publications Ltde., London, GB, AN 274794 (1992).

A. Usujima, Influence of Environmental Contamination on Chemically Amplified Positive Resist, Preprint of (1994) Spring Meeting of Japan Applied Physics Society, p. 566, 29a–MB–10.

T. Fukushima, A Study for Substrate Surface Effect of Chemically Amplified Resist, Central Research Laboratory, Sharp Co., Ltd, Preprint of (1994) Spring Meeting of Japan applied Physics Society, p. 566, 29p–MB–1.

B.W. Dudley, et al., Advances in Resist Technology adn Processing IX, SPIE, vol. 1672, 638 (1992).

Y. Tani, Optimization of Amorphous–Carbon Deposited Anti–Reflective Layer (2), Matsushita Electronics Corp., Kyoto Research Lab, Preprint of (1994) Spring Meeting of Japan Applied Physics Society, p. 567, 29p–MB–4.

Primary Examiner—Philip C. Tucker
Attorney, Agent, or Firm—Millen, White, Zelano & Branigan, P.C.

[57] ABSTRACT

An anti-reflective coating composition comprising a polyimide dissolved in an organic solvent is used to form an anti-reflective coating beneath a chemical amplification type resist layer. The composition allows a fine resist pattern to be formed with high accuracy in a convenient, efficient, reproducible manner.

16 Claims, 2 Drawing Sheets

ANTI-REFLECTIVE COATING COMPOSITION

This application is a continuation of application Ser. No. 08/441,739, filed May 16, 1995, now abandoned.

BACKGROUND OF THE INVENTION

1. Field of the Invention

This invention relates to an anti-reflective coating composition which is highly sensitive to high energy radiation such as deep-ultraviolet rays, electron rays and X-rays, can be developed with alkaline aqueous solution to form a pattern, and is thus suitable as an undercoat layer applicable prior to a chemically amplified resist in a fine patterning technique.

2. Prior Art

As the LSI technology tends toward higher integration and higher speed, further refinement of pattern rules is required. The patterning technology mostly relies on light exposure which is now approaching the essential limit of resolution which is dictated by the wavelength of a light source. It is generally recognized that in light exposure using g-ray (wavelength 436 nm) or i-ray (wavelength 365 nm) as a light source, a pattern rule of about 0.5 $\mu$m is the limit. For LSIs fabricated by such light exposure technique, a degree of integration equivalent to 16 mega-bit DRAM is the limit. At present, LSIs fabricated in the laboratory have reached this stage. It is urgently required to develop a finer patterning technique.

Under such circumstances, deep-ultraviolet lithography is regarded promising as the next generation of fine patterning technology. The deep-UV lithography is capable of working on the order of 0.3 to 0.4 $\mu$m. If a less light absorbing resist is used, it is possible to form a pattern having a side wall nearly perpendicular to the substrate. Great attention is now paid to the technique of utilizing a high illuminance KrF excimer laser as a deep-UV light source. In order to employ this technique on a mass production scale, a resist material having low light absorption and high sensitivity is desired.

From this point of view, a number of chemically amplified, positive working resist materials were recently developed using acid catalyst as disclosed in JP-B 2-27660, JP-A 63-27829, U.S. Pat. Nos. 4,491,628 and 5,310,619. These materials have high sensitivity, resolution and dry etching resistance and are promising as resist materials especially suited for deep-UV lithography.

Since the deep-UV lithography is, however, affected by the standing wave which can develop because of single wavelength light used therein and if the substrate includes a step, affected by optical interference due to varying thickness of a resist layer across the step and halation at the step, resist images are reduced in dimensional precision, failing to work to an accurate pattern size.

Figure 1:
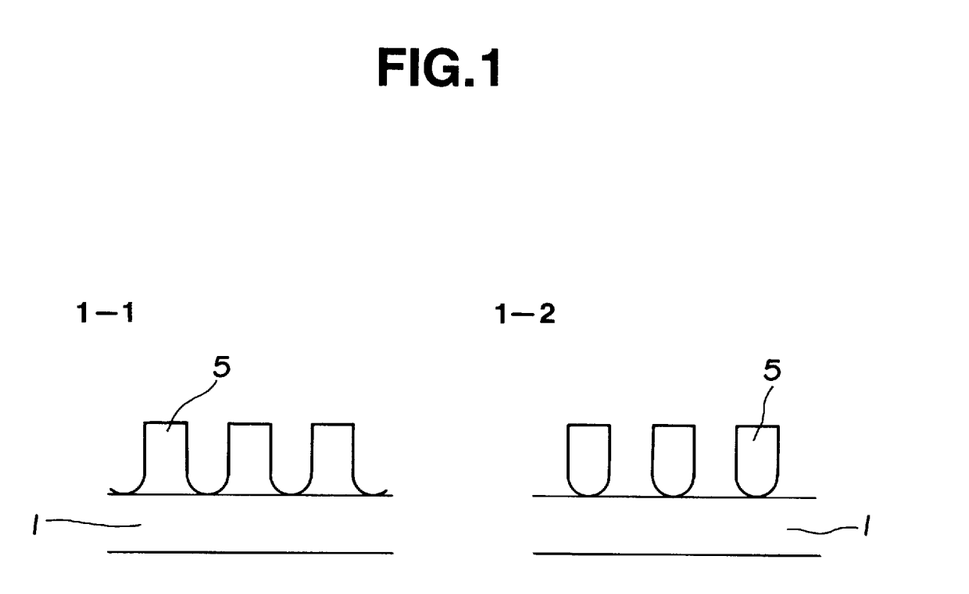
FIG. 1 schematically illustrates footing and notching associated with resist patterning.

The chemically amplified resist has the tendency that a pattern profile largely depends on a substrate. Particularly when the substrate is a nitride film, positive working resists entail footing at the contact of a resist pattern 5 with a substrate 1 as shown in FIG. 1—1. Negative working resists entail notching at the contact of a resist pattern 5 with a substrate 1 as shown in FIG. 1-2. See Usujima et al., Preprint of 1994 Spring Meeting of Japan Applied Physics Society, p. 566, 29a, MB-10 and Fukushima et al., Preprint of 1994 Spring Meeting of Japan Applied Physics Society, p. 566, 29p, MB-1. It is believed that such footing and notching occur because the N—H bond in the nitride film deactivates the acid at the chemically amplified resist/nitride film substrate interface.

The above-mentioned problem can be solved by a newly proposed pattern forming technique wherein an anti-reflective coating underlies a resist layer. It is often referred to as an anti-reflective coating (ARC) technique. See B. W. Dudley et al., SPIE, Vol. 1672, Advances in Resist Technology and Processing, IX, 638 (1992) and Tani et al., Preprint of 1994 Spring Meeting of Japan Applied Physics Society, p. 567, 29p, MB-4. The ARC technique generally uses inorganic and organic coatings as the anti-reflective coating. The ARC technique using inorganic coatings suffers from the problem that such coatings should be formed by sputtering or chemical vapor deposition (CVD) which requires a relatively expensive apparatus.

The ARC technique using organic coatings has the advantages that only a less costly coater is required for forming organic coatings and an increased throughput is expected since the processing time is reduced as compared with inorganic coatings. However, there is yet available no material which satisfies the requirements for working to a precise pattern size in the deep-UV (wavelength 245–255 nm) lithography that it has a coefficient of extinction k (which is the imaginary part of a complex index of refraction) of at least 0.3 in the deep-UV region and it induces no "footing" or "notching". JP-B 6-12452 discloses an anti-reflective coating material for common resists using a diazonaphthoquinone compound rather than the currently known chemically amplified resists. This anti-reflective coating material includes a polyamic acid as a main component, which is chemically converted into a polyimide by heating, for example, at 140° C. for 30 minutes or more after film formation. The resulting polyimide coating satisfies the required coefficient of extinction k, but induces footing and notching because like nitride films, all the N—H bonds (amine residues in a polyamic acid backbone and terminal amine residues) in the film have not been converted into inert groups or imide groups after heat treatment and ammonia is generated by high-temperature heating. This coating is thus unacceptable. U.S. Pat. No. 5,234,990 discloses an anti-reflective coating material for common resists using another diazonaphthoquinone compound. This material which employs polysulfone as a main component does not induce footing and notching, but fails to satisfy the coefficient of extinction k.

SUMMARY OF THE INVENTION

Therefore, an object of the present invention is to provide a novel and improved anti-reflection coating composition which is suitable as an undercoat layer for a chemically amplified resist and allows for formation of a resist pattern having advantages of fineness, high dimensional precision, simplicity, high productivity, and reproducibility.

Searching for an anti-reflection coating composition which is highly sensitive to high energy radiation such as deep-UV rays, electron rays and X-rays, especially deep-UV rays (wavelength 245–255 nm), can be developed with an alkaline aqueous solution to form a pattern, and is thus suitable as an undercoat layer applicable prior to a chemically amplified resist in a fine patterning process utilizing the ARC technique, the inventors have found that a composition comprising as a main component an organic solvent-soluble polyimide, especially selected from compounds of the general formulae (5), (7), (8) and (9) to be described later can satisfy the above-mentioned requirements of an anti-reflective coating material used in the deep-UV lithography that it has a coefficient of extinction k (the imaginary part of a complex index of refraction) of at least 0.3 in the deep-UV region and it induces no "footing" or "notching".

More particularly, when an anti-reflective layer is formed from an anti-reflective film-forming composition based on an organic solvent-soluble polyimide and a pattern is defined by the ARC technique, a coefficient of extinction k of at least 0.3 is available, optical reflectivity at the resist/anti-reflective layer interface is suppressed, and transmittance is significantly reduced. This reduces a change of pattern size of a resist image caused by standing wave and halation in the resist layer, as compared with the use of a resist layer alone, thereby improving the dimensional accuracy of a resist image. Since an N—H bond can be eliminated by modifying a terminal amine residue with phthalic anhydride or the like, neither footing nor notching is induced. From a process aspect, the invention eliminates a need for heat treatment at high temperature for a long time, for example, above 140° C. for more than 30 minutes. The composition of the invention ensures a convenient process.

We have also found that by adding an acid generator or organic acid to the anti-reflective composition for the purpose of furnishing acid to the resist/anti-reflective layer interface in exposed regions, the dimensional accuracy of a resist image is further improved.

Briefly stated, the present invention provides an anti-reflective coating composition comprising a soluble polyimide dissolved in an organic solvent.

BRIEF DESCRIPTION OF THE DRAWINGS

FIG. 2 (a)–(e) illustrates a typical lithographic process for forming a resist pattern using an inventive anti-reflective coating composition.

DETAILED DESCRIPTION OF THE INVENTION

A major component of an anti-reflective coating composition according to the invention is a polyimide which is soluble in an organic solvent. The polyimide may be selected from various polyimides as long as it can be dissolved in an organic solvent to form a composition which can be spin coated. Preferably it has a logarithmic viscosity in the range of 0.01 to 5 dl/g. Some polyimides having a logarithmic viscosity of less than 0.01 dl/g do not form a film whereas polyimides having a logarithmic viscosity of more than 5 dl/g would be insoluble in organic solvents.

The logarithmic viscosity, also known as inherent viscosity (IV), is determined by measuring the viscosity of a dilute solution of 0.5 g a polyimide in 100 ml N,N-dimethylformamide (DMF) at 30° C. Calculation is made according to the following equation:

$$IV(dl/g) = \{ln(\eta/\eta_0)\}/c$$

wherein $\eta$ is a solution viscosity, $\eta_0$ is a solvent viscosity, and c is a polymer concentration in the solution.

Preferably, the organic solvent-soluble polyimides have structures of the following general formulae (1) to (4).

In the formulae, p is equal to 0 or 1. When p is 1, X is —CH$_2$—, —O—, —CO—, —SO$_2$—, —C(CH$_3$)$_2$—, —C(CF$_3$)$_2$—or and X' is —CH$_2$—, —SO$_2$—, —C(CH$_3$)$_2$— or —C(CF$_3$)$_2$—.

Letter n is a number such that the polyimide may have a logarithmic viscosity in the range of 0.01 to 5 dl/g.

More preferred among these organic solvent-soluble polyimides are those having a terminal amine residue modified with a phthalic anhydride derivative, specifically the compounds illustrated below. Among these, compounds of formulae (5), (7), (8) and (9) are especially preferred.

(5)

(6)

-continued

(7)

(8)

(9)

The organic solvent-soluble polyimide is preferably blended in an amount of about 1 to 20% by weight, more preferably about 3 to 10% by weight of an entire coating composition so that an anti-reflective layer obtained therefrom may have a thickness of about 100 to 2,000 Å (0.01 to 0.2 μm). Concentrations of less than 1% by weight would result in films which are thinner than 100 Å and hence, less anti-reflective whereas concentrations of more than 20% by weight would result in films which are thicker than 2,000 Å, imposing a greater burden on etching.

The organic solvent is preferably one which can be spin coated. Exemplary organic solvents include ketones such as cyclohexanone, ethers such as propylene glycol dimethyl ether and diethylene glycol dimethyl ether (diglyme), and esters such as methyl-3-methoxypropionate and ethyl-3-ethoxypropionate, alone or in admixture thereof. Among these, cyclohexanone, diglyme, and methyl-3-methoxy-propionate are most preferred because the polyimides and acid generators are most soluble therein.

Preferably the organic solvent is used in an amount of about 80 to 99%, especially about 90 to 97% by weight of an entire coating composition.

In one preferred embodiment, an acid generator is added to the anti-reflective coating composition for the purpose of furnishing acid to the resist/anti-reflective layer interface in exposed regions.

Examples of the acid generator include onium salts, pyrogallol trimesilate derivatives, oxime sulfonic acid derivatives, 2,6-dinitrobenzylsulfonic acid derivatives, diazonaphthoquinone sulfonate derivatives, 2,4-bistrichloromethyl -6-aryl-1,3,5-triazine derivatives, and α,α'-bisarylsulfonyldiazo-methane derivatives. Especially preferred are onium salts of the following general formula (10).

$(R')_mMY$  (10)

wherein R', which may be identical or different, is independently selected from substituted or unsubstituted aromatic groups, M represents onium such as sulfonium and iodonium, Y is an anion such as p-toluene sulfonate and trifluoromethane sulfonate, and m is 2 or 3. The aromatic groups represented by R' are typically phenyl and substituted phenyl having an alkyl or alkoxy group with 1 to 10 carbon atoms.

Preferred onium salts are iodonium and sulfonium salts, examples of which are given below.

Such acid generators are preferably employed in amounts from about 1 to 100 parts, especially about 3 to 25 parts by weight per 100 parts by weight of the polyimide. With less than 1 part of the acid generator, less acid is available at the resist/anti-reflective layer interface in exposed regions so that the addition of acid generator is meaningless. Compositions containing more than 100 parts of the acid generator would fail to provide an extinction coefficient of at least 0.3.

In the practice of the invention, surfactants may be added to the coating composition in order to facilitate coating. Also, at least one light absorber having a molar absorption coefficient of at least 20,000 in the deep UV range (wavelength 245–255 nm) may be added in accordance with the reflectivity of a substrate. In order to supply acid to the anti-reflective layer, there may be added organic acids such as acetic acid, propionic acid, lactic acid, p-toluenesulfonic acid, trifluoromethanesulfonic acid, and trifluoroacetic acid. It is understood that the surfactant, light absorber and organic acid may be added in conventional amounts insofar as the benefits of the invention are not lost.

The anti-reflective coating composition of the invention is obtained by mixing the above-described essential and optional components. It is best suited for fine patterning using deep UV of wavelength 245–255 nm and KrF excimer laser light of wavelength 248 nm. It is also useful as an anti-reflective film for commonly used resists based on diazonaphthoquinones.

Figure 2:
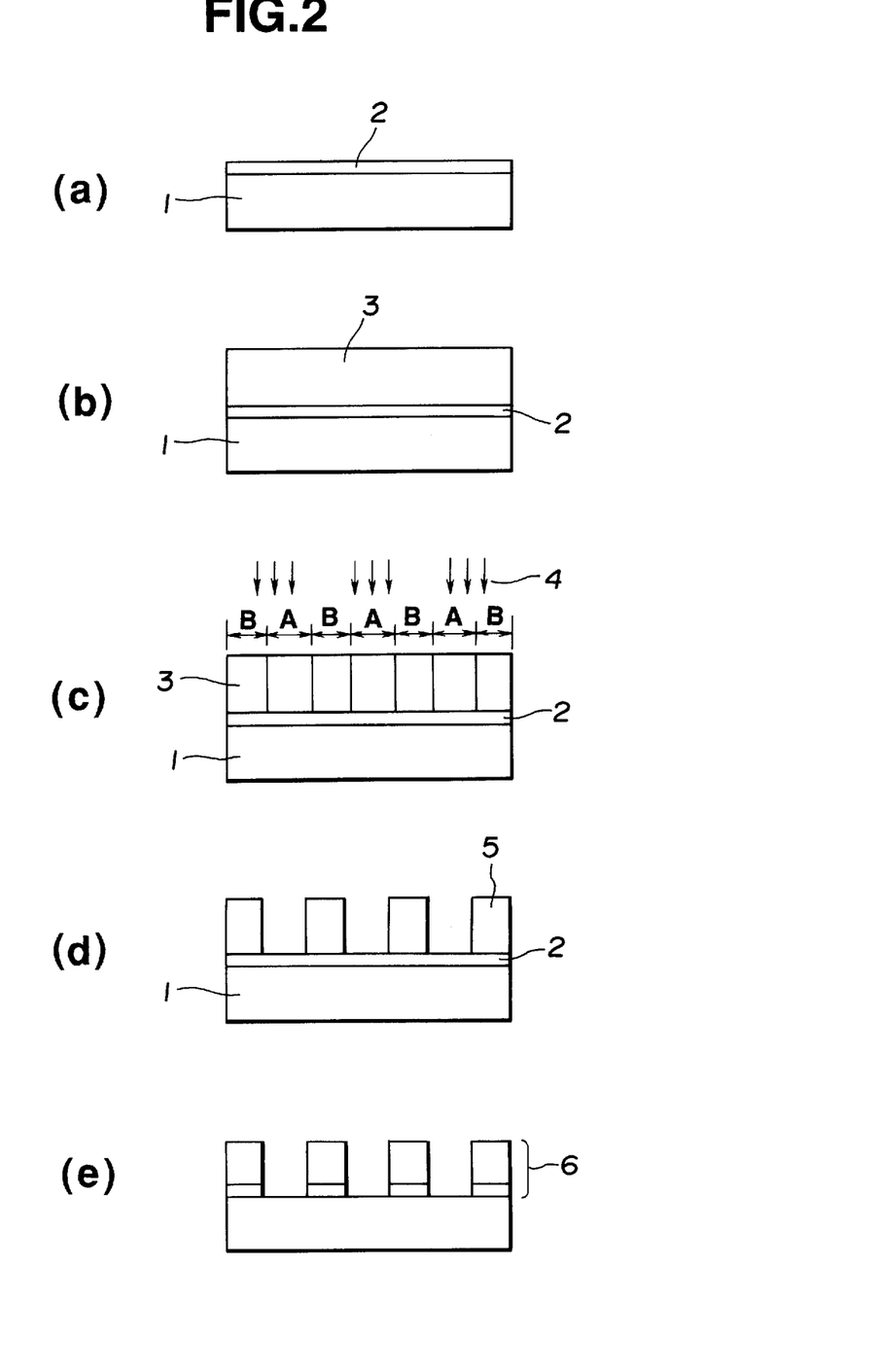

Any desired well-known technique may be used in forming a resist pattern using the anti-reflective composition according to the present invention. For example, a typical lithographic process using a positive resist of the chemical amplification type is shown in FIG. 2. First on a high reflectivity substrate 1 of silicon, silicon oxide, silicon nitride, tungsten silicide, aluminum or the like, the anti-reflective composition according to the invention is spin coated and optionally baked (by heating at about 100° C. within 120 seconds for removing the residual solvent from the coating) to form an anti-reflective layer 2 as shown in FIG. 2(a). A positive resist material of the chemical amplification type is spin coated onto the anti-reflective layer 2 and pre-baked to form a resist layer 3 as shown in FIG. 2(b). The resist layer 3 is exposed to a desired pattern of high energy radiation 4, for example, deep UV radiation having a wavelength of 245 to 255 nm and KrF excimer laser light having a wavelength of 248 nm by a demagnification projection technique. That is, regions A of the resist layer 3 are illuminated as shown in FIG. 2(c). B is a non-exposure portion. Thereafter, the resist layer 3 is subject to post-exposure baking (PEB) and developed with a conventional developer, obtaining a resist pattern 5 as shown in FIG. 2(d). Since the anti-reflective layer 2 is not dissolved during alkaline development, selective etching of the anti-reflective layer 2 is carried out using oxygen plasma. Since the resist pattern 5 is transferred with a high accuracy, a resist pattern 6 is formed to a high dimensional accuracy at the end of etching as shown in FIG. 2(e).

EXAMPLE

Examples of the present invention are given below by way of illustration and not by way of limitation.

Example 1

A positive resist composition of the chemical amplification type was prepared which had the following formulation.

| Ingredients | Parts by weight |
| --- | --- |
| Polyhydroxystyrene having some hydroxyl groups protected with t-butoxycarbonyl groups | 75 |
| Trifluoromethanesulfonate triphenylsulfonium | 5 |
| 2,2'-bis(4-tert-butoxycarbonyloxyphenyl)propane | 20 |
| 1-ethoxy-2-propanol | 500 |

An anti-reflective coating composition was prepared which had the following formulation.

| Ingredients | Parts by weight |
| --- | --- |
| Organic solvent - soluble polyimide A with a logarithmic viscosity of 0.2 dl/g | 5 |
| Diglyme | 95 |

Polyimide A:

A resist pattern was formed according to the lithographic process shown in FIG. 2.

First, the anti reflective coating composition was spin coated onto a reflectivity substrate 1 of silicon nitride to form an anti-reflective layer 2 of 0.1 μm thick as shown in FIG. 2(a). If desired, the layer might be baked at 100° C. for 90 seconds. Next, the positive resist composition of the chemical amplification type was spin coated onto the anti-reflective layer 2 and pre-baked at 100° C. for 120 seconds to form a resist layer 3 having a thickness in the range of 0.6 μm to 1.0 μm as shown in FIG. 2(b).

The resist layer was exposed using an excimer laser stepper NSR-2005EX8A (manufactured by Nikon K. K., numerical aperture NA=0.5) as shown in FIG. 2(c). It was subject to post-exposure baking (PEB) at 90° C. for 60 seconds and then developed with an aqueous solution of 2.38% tetramethylammonium hydroxide, obtaining a positive pattern as shown in FIG. 2(d).

The resulting resist pattern with a line-and-space of 0.30 μm was examined for size variation. The single resist layer lithography had a size variation of more than about ±0.050 μm and induced footing whereas the lithography using the inventive anti-reflective coating composition succeeded in reducing the size variation to about ±0.020 μm without footing.

Thereafter, selective etching was carried out using an oxygen plasma. Since the resist pattern 5 was faithfully transferred with a high accuracy, a resist pattern 6 was formed to a high dimensional accuracy at the end of etching as shown in FIG. 2(e).

Example 2

An anti-reflective coating composition was prepared which had the following formulation.

| Ingredients | Parts by weight |
| --- | --- |
| Organic solvent-soluble polyimide A with a logarithinic viscosity of 0.2 dl/g | 4.5 |
| Trifluoromethanesulfonate bis(4-tert-butylphenyl)iodonium | 0.5 |
| Diglyme | 95 |

Using this anti-reflective coating composition, the procedure of Example 1 was repeated. The resulting resist pattern with a line-and-space of 0.30 μm was examined for size variation to find that the lithography using the inventive anti-reflective coating composition succeeded in reducing the size variation to about ±0.015 μm without footing.

Example 3

An anti-reflective coating composition was prepared which had the following formulation.

| Ingredients | Parts by weight |
| --- | --- |
| Organic solvent - soluble polyimide B with a logarithmic viscosity of 0.15 dl/g | 5 |
| Cyclohexanone | 95 |

Polyimide B:

Using this anti-reflective coating composition, the procedure of Example 1 was repeated. The resulting resist pattern with a line-and-space of 0.30 μm was examined for size variation to find that the lithography using the inventive anti-reflective coating composition succeeded in reducing the size variation to about ±0.020 μm without footing.

Example 4

An anti-reflective coating composition was prepared which had the following formulation.

| Ingredients | Parts by weight |
| --- | --- |
| Organic solvent soluble polyimide B with a logarithmic viscosity of 0.2 dl/g | 5 |
| Trifluoromethanesulfonate triphenylsulfonium | 1 |
| Cyclohexanone | 94 |

Using this anti-reflective coating composition, the procedure of Example 1 was repeated. The resulting resist pattern with a line-and-space of 0. 30 μm was examined for size variation to find that the lithography using the inventive anti-reflective coating composition succeeded in reducing the size variation to about ±0.015 μm without footing.

Example 5

An anti-reflective coating composition was prepared which had the following formulation.

| Ingredients | Parts by weight |
| --- | --- |
| Organic solvent - soluble polyimide C with a logarithmic viscosity of 0.1 dl/g | 4.5 |
| Trifluoromethanesulfonate bis(4-tert-butylphenyl)iodonium | 0.5 |
| Diglyme | 95 |

Polyimide C:

Using this anti-reflective coating composition, the procedure of Example 1 was repeated. The resulting resist pattern with a line-and-space of 0.30 μm was examined for size variation to find that the lithography using the inventive anti-reflective coating composition succeeded in reducing the size variation to about ±0.015 μm without footing.

Example 6

An anti-reflective coating composition was prepared which had the following formulation.

| Ingredients | Parts by weight |
| --- | --- |
| Organic solvent - soluble polyimide D with a logarithmic viscosity of 0.1 dl/g | 5 |

-continued

| Ingredients | Parts by weight |
| --- | --- |
| Pyrogallol trimesilate | 1 |
| Diglyme | 94 |

Polyimide D:

Using this anti-reflective coating composition, the procedure of Example 1 was repeated. The resulting resist pattern with a line-and-space of 0.30 μm was examined for size variation to find that the lithography using the inventive anti-reflective coating composition succeeded in reducing the size variation to about ±0.018 μm without footing.

Example 7

An anti-reflective coating composition was prepared which had the following formulation.

| Ingredients | Parts by weight |
| --- | --- |
| Organic solvent - soluble polyimide E with a logarithmic viscosity of 0.1 dl/g | 5 |
| Trifluoromethanesulfonate bis(4-tert-butylphenyl)iodonium | 1 |
| Diglyme | 94 |

Polyimide E:

Using this anti-reflective coating composition, the procedure of Example 1 was repeated. The resulting resist pattern with a line-and-space of 0.30 μm was examined for size variation to find that the lithography using the inventive anti-reflective coating composition succeeded in reducing the size variation to about ±0.015 μm without footing.

There has been described an anti-reflective coating composition which when used as an anti-reflective film underlying a chemical amplification type resist in patterning by the ARC technique, satisfies the requirements that it has a coefficient of extinction k of at least 0.3 in the deep-UV region and it induces no "footing" or "notching". The composition thus allows a fine resist pattern to be formed with high accuracy in a convenient, efficient, reproducible manner.

Japanese Patent Application No. 6-169971 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. An anti-reflective coating composition comprising an organic solvent-soluble polyimide having a structural element selected from the group consisting of the following general formulae (1) to (4):

(1)

(2)

(3)

-continued (4)

wherein X is —CH$_2$—, —SO$_2$— or —C(CH$_3$)$_2$— or X' is —CH$_2$—, —SO$_2$—, —C(CH$_3$)$_2$— or —C(CF$_3$)$_2$——C(CF$_3$)$_2$—, letter p is equal to 0 or 1 and letter n is a number such that the polyimide has a logarithmic viscosity in the range of 0.01 to 5 dl/g, and an organic solvent selected such that the composition is spin coatable.

2. The composition of claim 1 wherein said polyimide is selected from compounds having the following general formulae (5), (7), (8) and (9):

(5)

(7)

-continued (8)

(9)

wherein p is equal to 0 or 1,

X is selected from the group consisting of —CH$_2$—, —SO$_2$— or —C(CH$_3$)$_2$—, X' is selected from the group consisting of —CH$_2$—, —SO$_2$—, —C(CH$_3$)$_2$— or —C(CF$_3$)$_2$—, —C(CF$_3$)$_2$—, and n is a number such that said polyimide has a logarithmic viscosity in the range of 0.01 to 5 dl/g.

3. The composition of claim 1 further comprising an acid generator.

4. An anti-reflective coating composition comprising an organic solvent-soluble polyimide, an acid generator and an organic solvent, wherein the organic solvent-soluble polyimide contains a structural element selected from the group consisting of the following formulae (1) to (4):

(1)

(2)

(3)

(4)

wherein X is —CH$_2$—, —O—, —CO—, —SO$_2$—, —C(CH$_3$)$_2$, —C(CF$_3$)$_2$— or X' is —CH$_2$—, —O—, —SO$_2$—, —C(CH$_3$)$_2$— or —C(CF$_3$)$_2$—, letter p is equal to 0 or 1 and letter n is a number such that the polyimide has a logarithmic viscosity in the range of 0.01 to 5 dl/g.

5. The composition of claim 4 wherein said polyimide has a logarithmic viscosity in the range of 0.01 to 5 dl/g.

6. The composition of claim 4 wherein said polyimide is selected from compounds having the following general formulae (5), (7), (8) and (9):

(5)

-continued (7)

(8)

(9)

wherein p is equal to 0 or 1,

X is selected from the group consisting of —CH₂—, —O—, —CO—, —SO₂—, —C(CH₃)₂—, —C(CF₃)₂— and X' is selected from the group consisting of —CH₂—, —O—, —SO₂—, —C(CH₃)₂—, and —C(CF₃)₂—, and n is a number such that said polyimide may have a logarithmic viscosity in the range of 0.01 to 5 dl/g.

7. The composition of claim 1 further comprising an organic acid.

8. The composition of claim 4, wherein the composition contains 1 to 20% by weight of the organic solvent-soluble polyimide.

9. The composition of claim 1, wherein the composition contains 1 to 20% by weight of the organic solvent-soluble polyimide.

10. The composition of claim 4, wherein the organic solvent is cyclohexanone, propylene glycol dimethyl ether, diglyme, methyl-3-methoxypropionate or ethyl-3-ethoxypropionate.

11. The composition of claim 1, wherein the organic solvent is cyclohexanone, propylene glycol dimethyl ether, diglyme, methyl-3-methoxypropionate or ethyl-3-ethoxypropionate.

12. The composition of claim 4, wherein the acid generator is an onium salt of the formula (10):

$(R')_m MY$          (10)

wherein each R' is independently selected from phenyl and phenyl substituted with an alkyl or alkoxy group of 1–10 carbon atoms, M is an onium group, Y is an anion and m is 2 or 3.

13. The composition of claim 3, wherein the acid generator is an onium salt of the formula (10):

$(R')_m MY$          (10)

wherein each R' is independently selected from phenyl and phenyl substituted with an alkyl or alkoxy group of 1–10 carbon atoms, M is an onium group, Y is an anion and m is 2 or 3.

14. The composition of claim 4, wherein the composition contains 1 to 100 parts by weight of the acid generator per 100 parts by weight of the polyimide.

15. The composition of claim 3, wherein the composition contains 1 to 100 parts by weight of the acid generator per 100 parts by weight of the polyimide.

16. The composition of claim 7, wherein the organic acid is acetic acid, propionic acid, lactic acid, p-toluenesulfonic acid, trifluoromethanesulfonic acid or trifluoroacetic acid.

* * * * *